US007677542B2

(12) United States Patent
Grzina et al.

(10) Patent No.: US 7,677,542 B2
(45) Date of Patent: Mar. 16, 2010

(54) VACUUM-MOUNTED CLAMP

(75) Inventors: Donald J. Grzina, O'Fallon, MO (US); Scott A. Martin, Swansea, IL (US); Dustin D. Ribble, Dow, IL (US)

(73) Assignee: The Boeing Company, Chicago, IL (US)

( * ) Notice: Subject to any disclaimer, the term of this patent is extended or adjusted under 35 U.S.C. 154(b) by 1203 days.

(21) Appl. No.: 11/213,371

(22) Filed: Aug. 26, 2005

(65) Prior Publication Data

US 2007/0044293 A1 Mar. 1, 2007

(51) Int. Cl.

| | |
|---|---|
| ***B23P 19/00*** | (2006.01) |
| ***B23P 21/00*** | (2006.01) |
| ***B23Q 7/00*** | (2006.01) |
| ***B25B 11/00*** | (2006.01) |

(52) U.S. Cl. ............................ 269/21; 29/721; 29/743; 29/559; 269/54

(58) Field of Classification Search .................. 29/559, 29/743, DIG. 44, 721, 281.6, 283; 269/21, 269/35, 54

See application file for complete search history.

(56) References Cited

U.S. PATENT DOCUMENTS

| | | | | |
|---|---|---|---|---|
| 5,753,070 | A * | 5/1998 | Dandia | 156/382 |
| 7,310,865 | B2 * | 12/2007 | Cole et al. | 29/281.5 |

* cited by examiner

*Primary Examiner*—David P Bryant
*Assistant Examiner*—Alexander P Taousakis

(57) ABSTRACT

A vacuum-mounted clamp for clamping a first component to a second component. The clamp includes a substantially rigid body having an application face, a back face opposite the application face, a side, and a vacuum port extending between the application face and the back face. The application face has a step adjacent the side for engaging the first component. The clamp includes a flexible seal connected to the rigid body adjacent the application face. The seal has a vacuum port in fluid communication with the vacuum port in the primary body and a periphery for contacting the second component to create a vacuum area between the clamp and the second component. The vacuum port of the body and the seal are in fluid communication with a vacuum generator for generating a vacuum in the vacuum area.

12 Claims, 9 Drawing Sheets

VACUUM-MOUNTED CLAMP

BACKGROUND OF THE INVENTION

The present invention relates to a clamp and, more particularly, to a vacuum-mounted clamp for use in product manufacturing.

Product manufacturing often requires working two adjacent product components. These components may be unconnected and require work such as drilling and/or being fastened together. Such work requires adjacent components to be securely held together to avoid relative motion between the components.

Holding adjacent product components together is often difficult because of the high forces required to work the components while they are secured together and/or because of the size of the components. Holding components together can be especially challenging when one of them is a large panel that must be worked at an interior area spaced away from sides of the panel. Traditional clamps (e.g., C clamps, screw clamps, sash clamps, and pipe clamps) are ineffective to securely clamp another component to the panel and to ensure against relative motion at the interior area.

In one conventional method of securing a large panel component of a product to another product component, one or more personnel hold the components together using their hands or wooden blocks or sticks. This conventional method results in inconsistent securing and is labor intensive. Further, more labor is required to ensure product quality after the components are worked. In another conventional method, a temporary fastener is inserted into a first hole formed in the components. However, this conventional method cannot be used to ensure accurate formation of the first hole. Another conventional method involves using a spreader tool that forces opposing flanges apart when working one of the flanges and a panel positioned adjacent that flange to keep the flange from moving away from the panel during a drilling. This conventional method can only be performed where there is a sturdy object opposite the flange to be worked and the method is also labor intensive because implementation requires precise placement of the tool to avoid interference with the drill.

BRIEF SUMMARY OF THE INVENTION

The present invention relates to a vacuum-mounted clamp for clamping a first component to a second component. The clamp comprises a substantially rigid body having an application face, a back face opposite the application face, a side, and a vacuum port extending between the application face and the back face. The application face has a step adjacent the side for engaging the first component when clamping the first component to the second component. In addition, the clamp includes a flexible seal connected to the rigid body adjacent the application face. The seal has a vacuum port in fluid communication with the vacuum port in the primary body and a periphery for contacting the second component to create a vacuum area between the clamp and the second component when clamping the first component to the second component. The vacuum port of the body and the seal are in fluid communication with a vacuum generator for generating a vacuum in the vacuum area when clamping the first component to the second component.

In another aspect, the present invention includes a vacuum-mounted clamp for use during manufacture of a product having a first frame and a first panel connected together and a second frame and a second panel connected together. The clamp comprises a substantially rigid body having an application face, a back face opposite the application face, a first side extending between the faces, and a second side extending between the faces opposite the first side. The application face has a step adjacent each of the first and second sides for engaging the first and second frames, respectively, during operation of the clamp, and a vacuum port extending between the faces. Further, the clamp includes a flexible seal connected to the rigid body adjacent the application. The seal has a vacuum port in fluid communication with the vacuum port in the rigid body and a periphery for selectively contacting the first and second panels to respectively create a first vacuum area between the clamp and first panel and a second vacuum area between the clamp and the second panel when clamping the first frame to the first panel and the second frame to the second panel. The clamp is operatively connectable to a vacuum generator for selectively creating a vacuum in the vacuum areas.

In yet another aspect, the present invention includes a method of clamping a first component to a second component using a clamp having a substantially rigid body including an application face, a back face opposite the application face, and a side, the application face having a step adjacent the side, a flexible seal connected to the rigid body adjacent the application face. The method comprises contacting the first component with the step of the clamp, contacting the second component with the seal of the clamp to form a vacuum area between the clamp and the second component, and creating a vacuum in the vacuum area using a vacuum generator operatively connected to the clamp to releasably clamp the first component to the second component.

In still another aspect, the present invention includes a method of manufacturing a product having a first frame and a second frame connected to a first panel and a second panel, respectively, using a clamp having a substantially rigid body including an application face, a back face opposite the application face, a first side extending between the faces and a second side extending between the faces opposite the first side, and a seal connected to the rigid body adjacent the application face. The application face of the rigid body has a step adjacent each of the first and second sides. The method comprises contacting the first frame of the product with the first step of the clamp, contacting the first panel of the product with the seal of the clamp to form a first vacuum area between the clamp and the first panel, and creating a vacuum in the first vacuum area using a vacuum generator operatively connected to the clamp thereby releasably clamping the first frame to the first panel. In addition, the method comprises working the first frame and the first panel while they are clamped together by the clamp, and removing the vacuum from the first vacuum area. Further, the method comprises contacting the second frame of the product with the second step of the clamp, contacting the second panel of the product with the seal of the clamp to form a second vacuum area between the clamp and the second panel, and creating a vacuum in the second vacuum area using the vacuum generator thereby releasably clamping the second frame to the second planar portion. The method also comprises working the second frame and the second panel while they are clamped together by the clamp.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
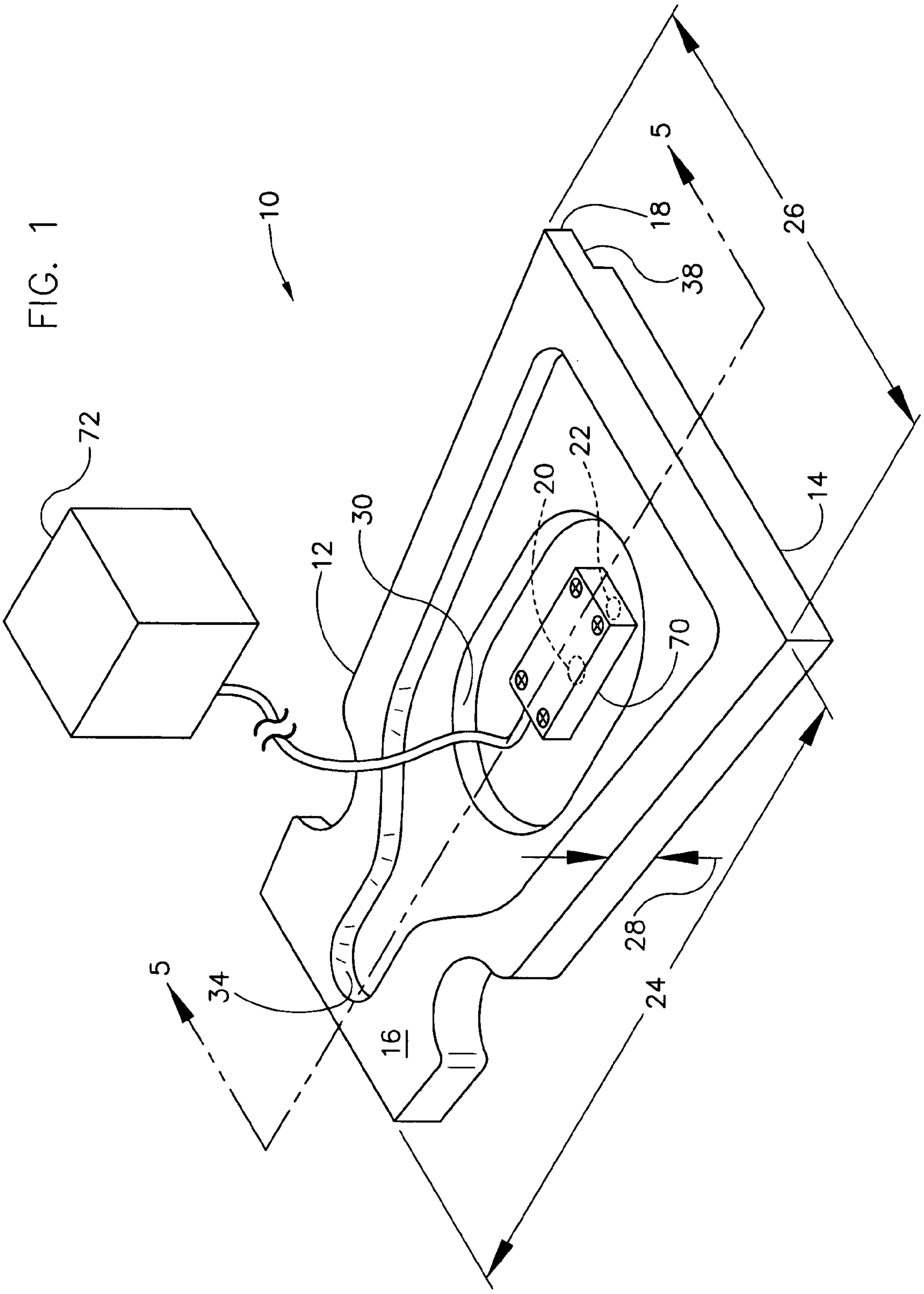
FIG. 1 is a perspective of a clamp according to a first embodiment of the present invention.
Figure 2:
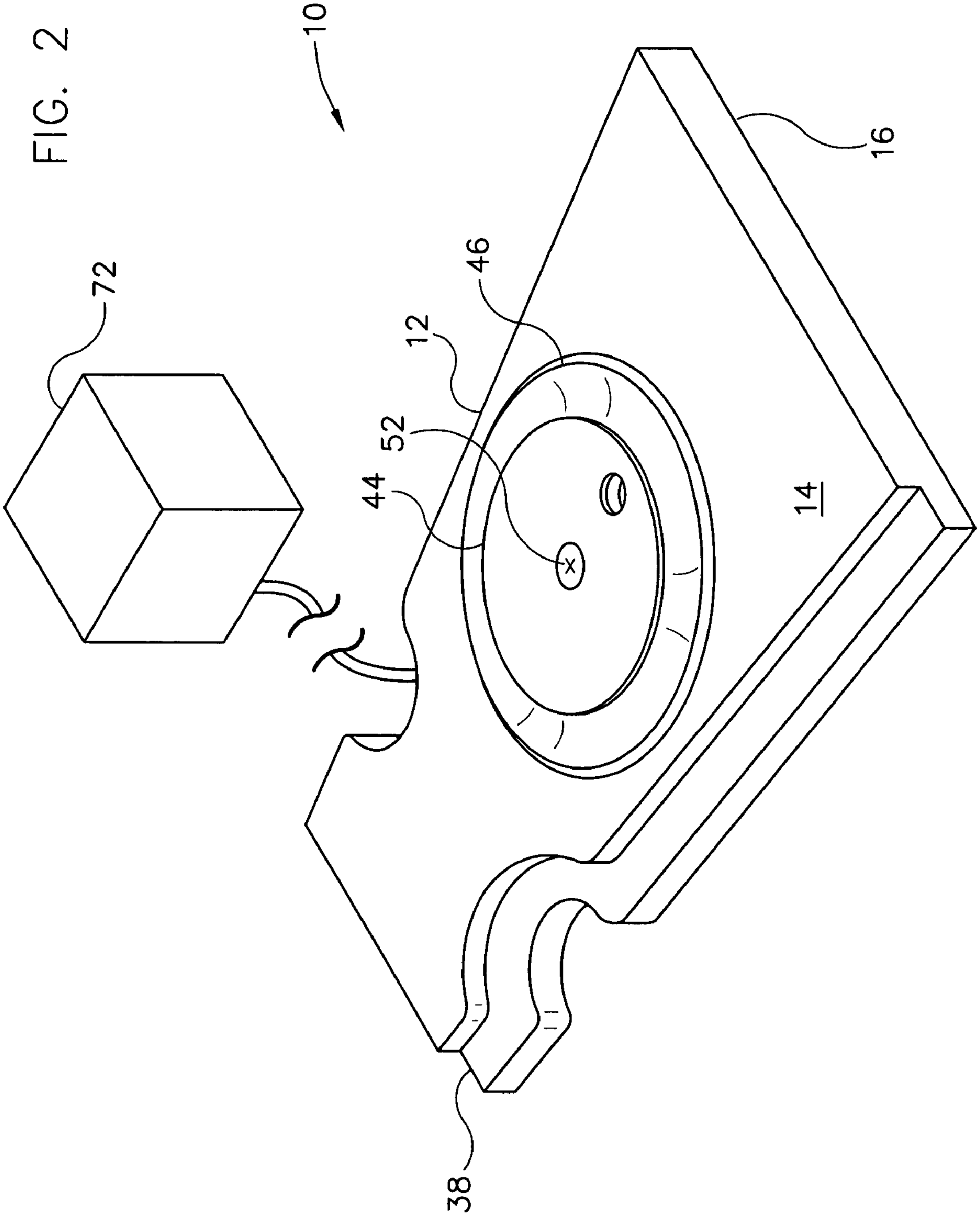
FIG. 2 is a perspective of a rigid body of the clamp according to the first embodiment.
Figure 3:
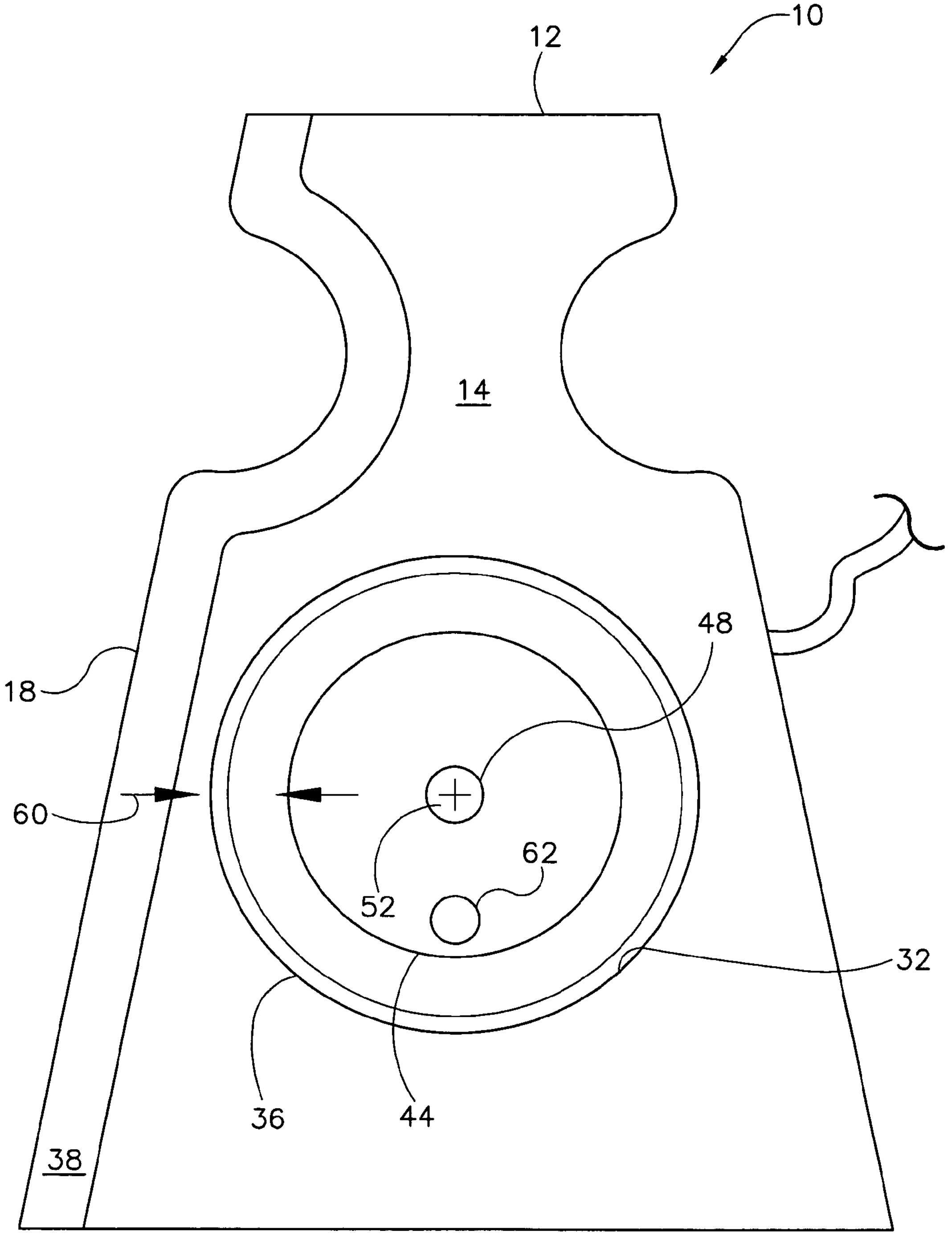
FIG. 3 is a bottom plan of the clamp according to the first embodiment shown without a flexible seal.

Referring to the figures, and more particularly to FIG. 1, a clamp according to a first embodiment of the present invention is designated in its entirety by reference number 10. The clamp 10 is used for clamping a first component to a second component (not shown in FIGS. 1-3). The clamp 10 includes a substantially rigid body 12. The rigid body 12 has an application face 14, a back face 16 opposite the application face, a side 18, and a vacuum port 20 and a fastening hole 22 extending between the application face and the back face. The size of the rigid body 12 depends on the size of the components being clamped. Although the rigid body 12 may have other lengths 24 without departing from the scope of the present invention, in one embodiment the rigid body has a length of between about 8" and about 12". Although the rigid body 12 may have other maximum widths 26 without departing from the scope of the present invention, in one embodiment the rigid body has a maximum width of between about 3" and about 6". Although the rigid body 12 may have other maximum thicknesses 28 without departing from the scope of the present invention, in one embodiment the rigid body has a maximum thickness of between about ½" and about 1". The body 12 may be somewhat flexible, but should maintain an amount of rigidity sufficient to enable it to support other parts of the clamp 10 during operation. Although the rigid body 12 may be made of other materials without departing from the scope of the present invention, in one embodiment the rigid body is made of aluminum. The back face 16 of the rigid body 12 includes a recess 30. As shown in FIG. 3, the application face 14 of the rigid body 12 also includes a recess 32. The application face 14 recess 32 has a perimeter 36. Each face 14, 16 may include multiple recesses. For example, as shown in FIGS. 1 and 2, the back face recess 30 may be formed within an larger backface recess 34. The recesses 30, 32, 34 in the rigid body 12 may receive other parts of the clamp 10 therein and reduce the weight of the clamp.

Figure 4:
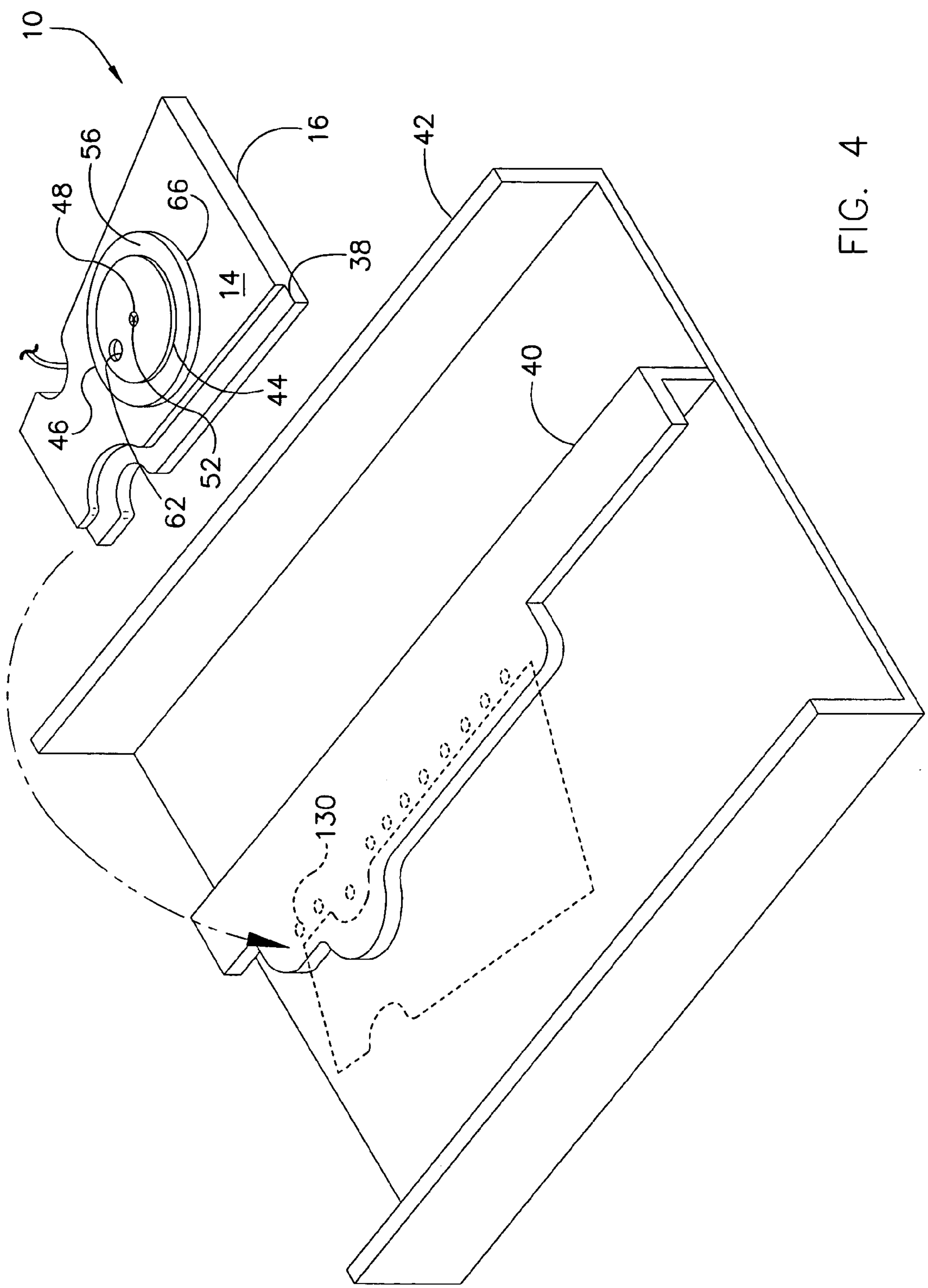
FIG. 4 is a perspective view of the clamp according to the first embodiment shown in combination with components of a product.

The application face 14 further includes a step 38 adjacent the side 18 for engaging the first component when clamping the first and second components together. As shown in FIG. 4, the step 38 is shaped to correspond to a shape of a first component 40 to ensure proper engagement with the first component when clamping the first component to a second component 42. The shape of the step 38 may also be shaped to allow for working the product while the first and second components 40, 42 are clamped together by the clamp. For example, in one embodiment, the step 38 is shaped so a user can drill holes through the first and/or second components 40, 42 without interfering with the drill or clamp 10. The components 40, 42 may be various parts of a product. For example, the first component 40 may be a frame of an aircraft and the second component 42 may be a cover or skin of the aircraft. The types of product on which clamps according to the present invention can be used are not limited.

Figure 5:
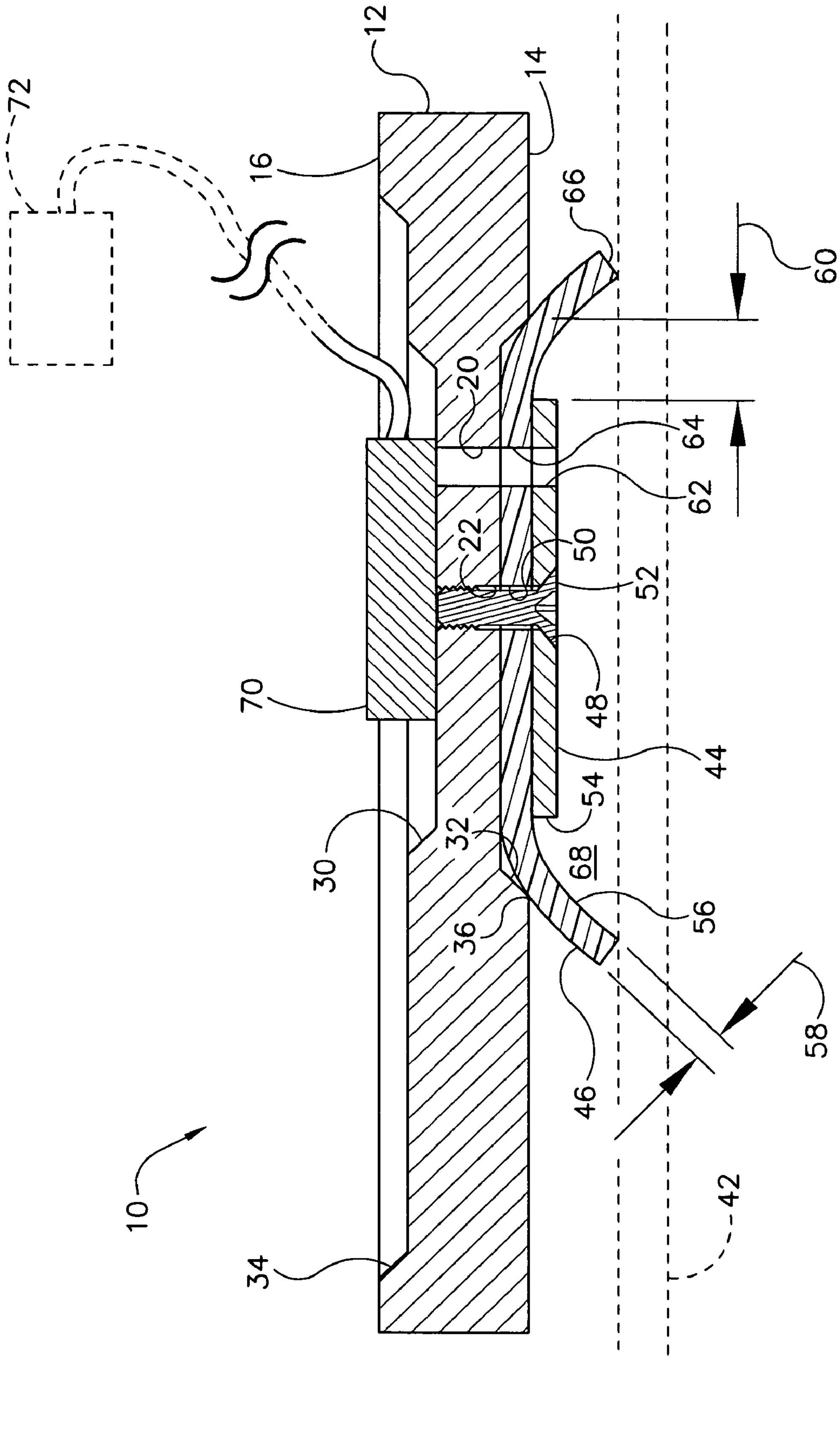
FIG. 5 is an enlarged cross section of the clamp according to the first embodiment taken along line 5-5 of FIG. 1.

The clamp 10 further includes a mounting plate 44 and a flexible seal 46 connected to the rigid body 12 adjacent the application face 14 of the rigid body. As shown in FIG. 5, the mounting plate 44 and seal 46 have aligned fastening holes 48, 50, respectively, corresponding to the fastening hole 22 in the rigid body 12. The clamp 10 further includes a fastener 52, such as a screw or a nut and bolt, disposed in the fastener holes 22, 48, 50 for connecting the body 12, the plate 44, and the seal 46 together. The mounting plate 44 has a periphery 54. In one embodiment, the application face recess 32 of the rigid body, the mounting plate 44, and the seal 46 have corresponding shapes. For example, as shown in FIGS. 3 and 4, each of the application face recess 32, the mounting plate 44, and the seal 46 has a generally circular shape. As another example, the application face recess, the seal, and the mounting plate may have generally rectangular or oval shapes (shown in FIGS. 7, 8, 10 and 11). The seal 46 is positioned between the mounting plate 44 and fastener 52 and the rigid body 12 and is partially disposed in the application face recess 32. The seal 46 has a lower surface 56, which may have a predisposed concave shape. In any event, the lower surface 56 of the seal 46 has a concave shape when the seal is secured to the rigid body 12 in the application face recess 32 by the mounting plate 44. Although the seal 46 may have other thicknesses 58 without departing from the scope of the present invention, in one embodiment the seal has a generally uniform thickness throughout. The seal may be made of various materials without departing from the scope of the present invention. For example, in one embodiment the seal 46 is made of a synthetic rubber, such as neoprene. Although the periphery 54 of the mounting plate 44 and the perimeter 36 of the application face recess 30 may be separated by other distances 60, in one embodiment the distance between the mounting plate periphery and the closest respective point along the perimeter of the application face recess is at least twice the thickness 58 of the seal 46.

The mounting plate 44 and seal 46 have aligned vacuum ports 62, 64, respectively, corresponding to the vacuum port 20 in the rigid body 12. The seal 46 further includes a periphery 66 for contacting the second component 42 to create a vacuum area 68 between the clamp 10 and the second component when clamping the first component 40 to the second component. The vacuum ports 20, 62, 64 are operatively connected to a vacuum generator 70 for generating a vacuum in the vacuum area 68 when clamping the first component 40 to the second component 42. Although the vacuum generator 70 may be other types without departing from the scope of the present invention, in one embodiment, the vacuum generator is a conventional vacuum generator such as a vacuum pump X10Lavailable from PIAB USA, Inc. of Hingham, Mass. Although vacuums of other strengths may be created without departing from the scope of the present invention, in one embodiment a vacuum of between about 15 in Hg and about 28 in Hg is produced in the vacuum area. As shown in FIGS. 1 and 5, the vacuum generator 70 may be mounted on the rigid body 12 in the back face recesses 30, 34. In one embodiment (not shown), the vacuum generator is operatively connected to the vacuum ports 20, 62, 64, but not mounted directly on the rigid body 12. Although the vacuum generator 70 may be powered by other sources without departing from the scope of the present invention, in one embodiment the generator is powered by a compressed air source 72. For example, the vacuum generator 70 may be connected to a universal or central compressed air line, commonly piped through most assembly plants.

Figure 6:
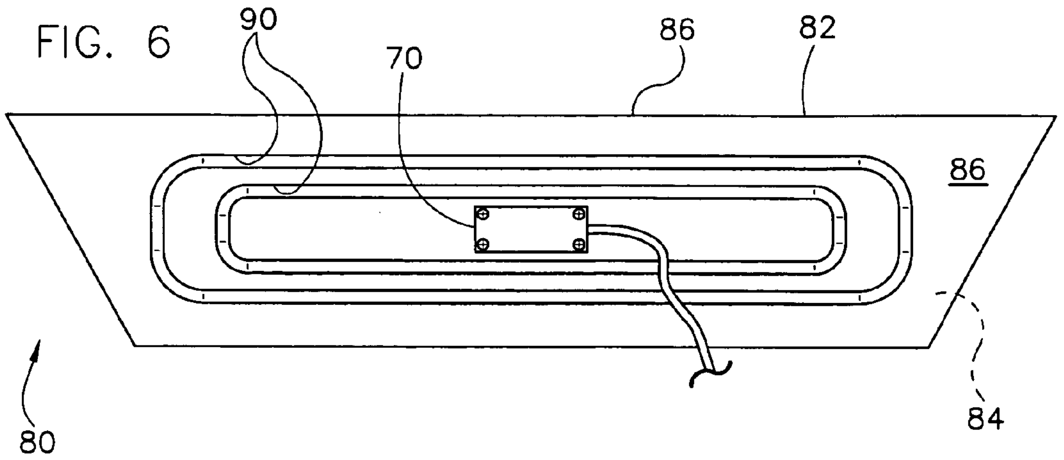
FIG. 6 is a top plan of a clamp according to a second embodiment of the present invention.
Figure 7:
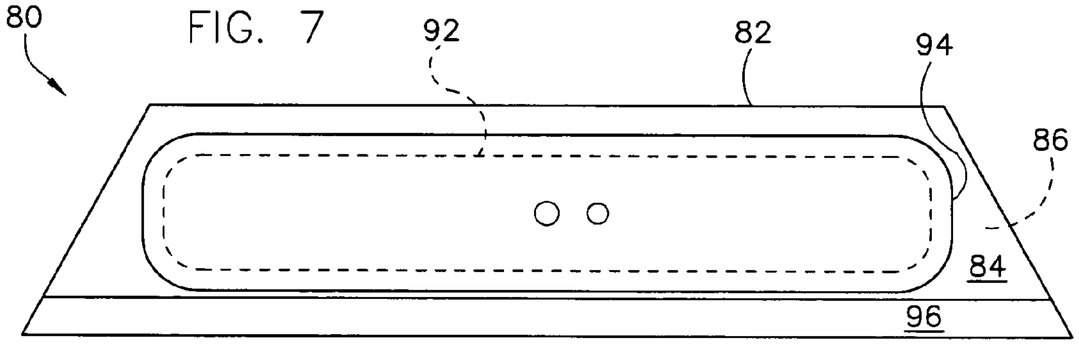
FIG. 7 is a bottom plan of the clamp according to the second embodiment.
Figure 8:
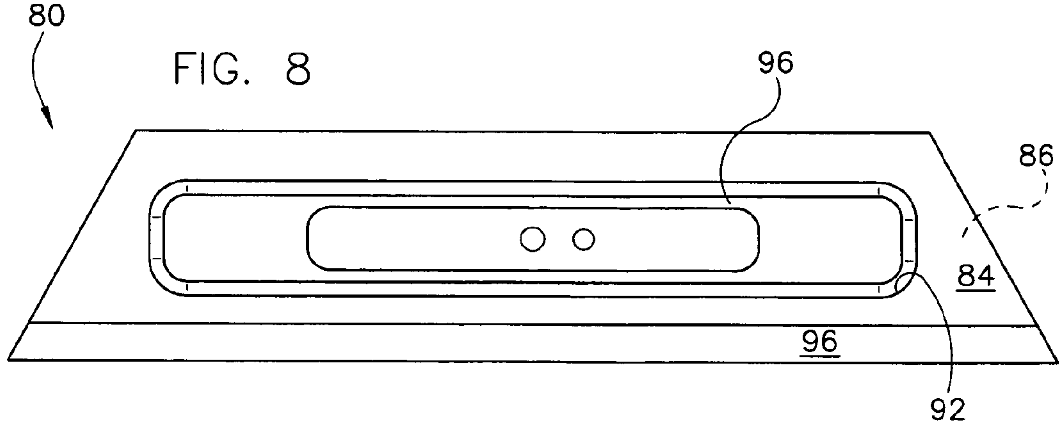
FIG. 8 is a bottom plan of the clamp according to the second embodiment shown without a flexible seal.

FIGS. 6-8 show a second embodiment of a clamp 80 according to the present invention. The clamp 80 of this embodiment includes a rigid body 82 having an application face 84, a back face 86, and a side 88. The back face 86 includes one or more recesses 90 and the application face 84 includes a recess 92. The clamp 80 further includes a flexible seal 94 and a mounting plate 96 connected to the rigid body 82 adjacent the application face 84 of the rigid body. The seal 94 is positioned between the rigid body 82 and the mounting plate 96 and partially disposed in the application face recess 92. The rigid body 82 includes a step 98 for engaging a first component of a product (not shown) when the clamp 80 is used to clamp the first component to second component of the product. The clamp 80 of the second embodiment is otherwise identical to the clamp of the first embodiment, and therefore will not be described in further detail.

Figure 9:
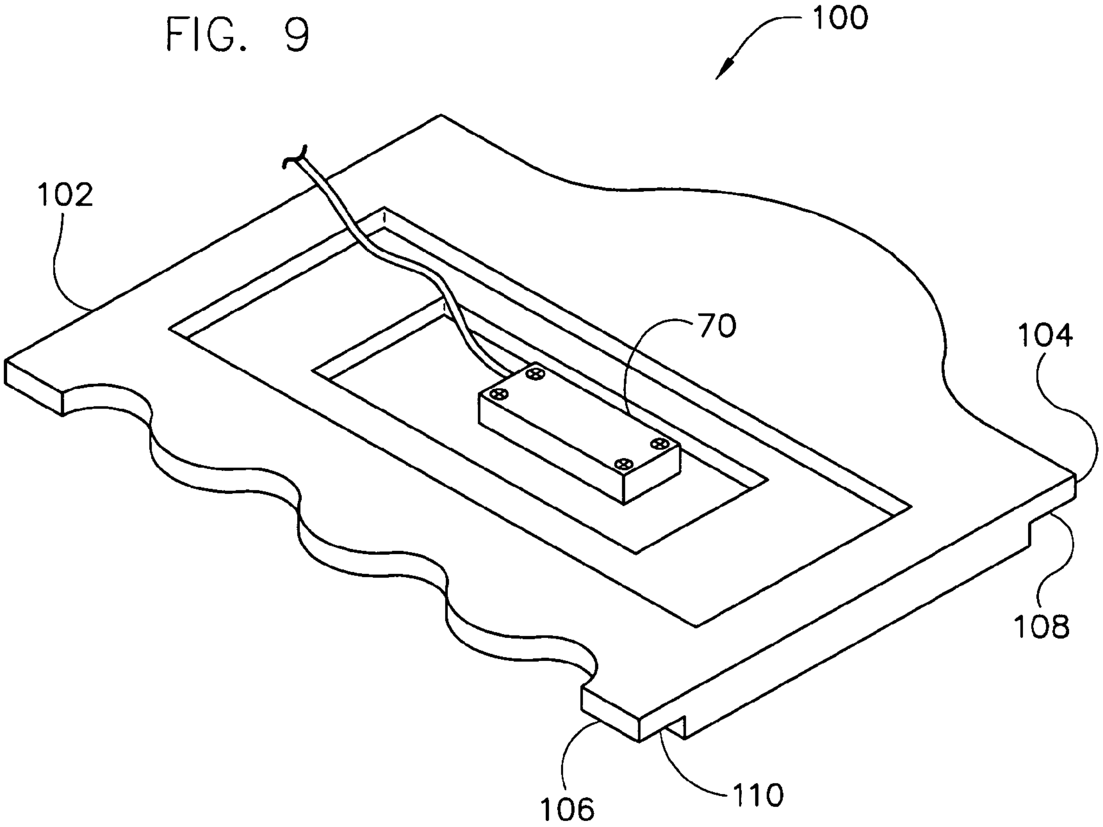
FIG. 9 is a top plan of a clamp according to a third embodiment of the present invention.
Figure 10:
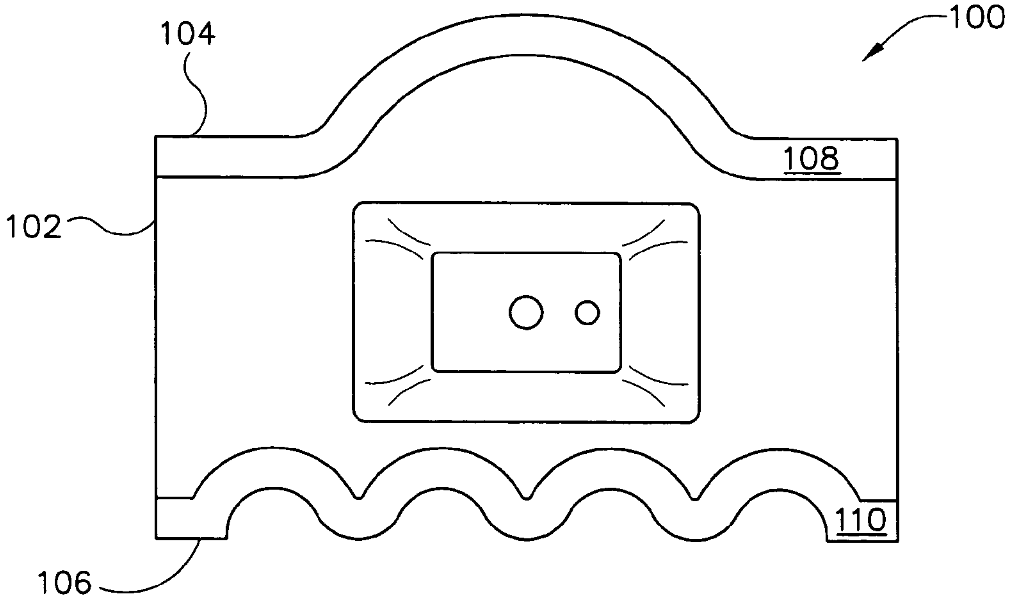
FIG. 10 is a perspective plan of the clamp according to the third embodiment.
Figure 11:
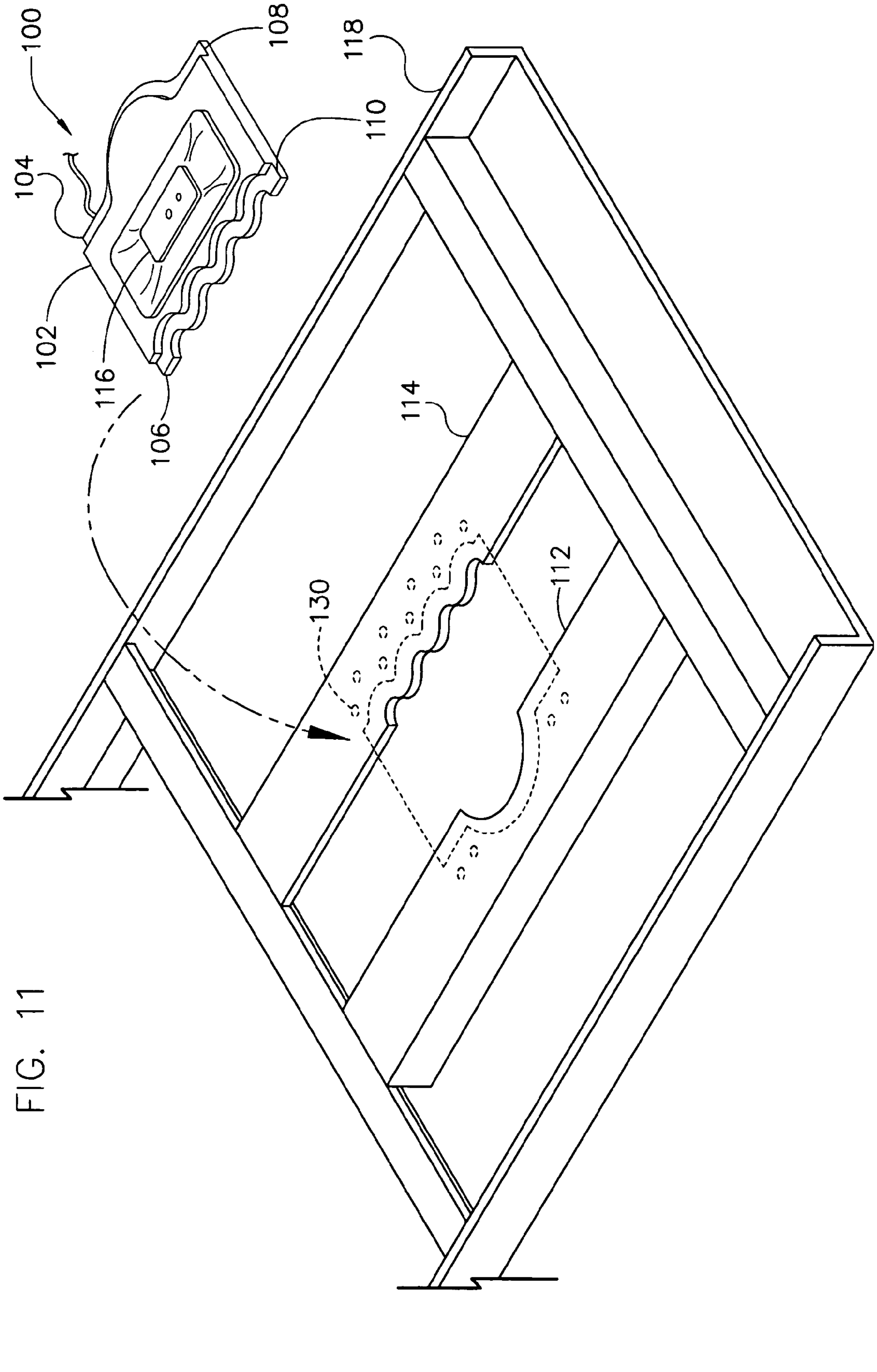
FIG. 11 is a perspective of the clamp according to the third embodiment shown in combination with components of a product.
Figure 12:
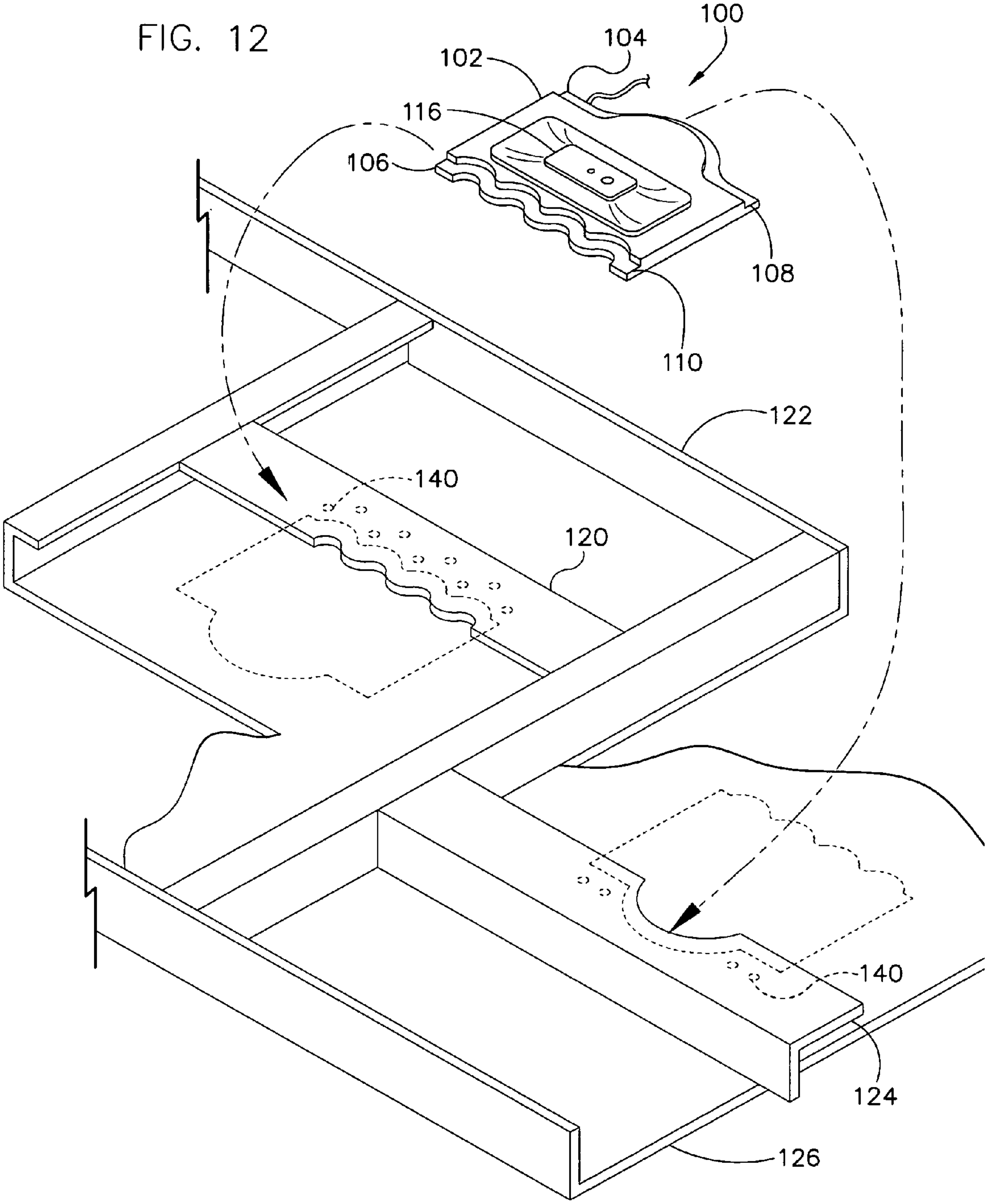
FIG. 12 is a perspective of the clamp according to the third embodiment shown in combination with other components of a product.

FIG. 9 shows a third embodiment of a clamp 100 according to the present invention. The clamp includes a rigid body 102 having a first side 104 and a second side 106 opposite the first side. As shown in FIG. 10, a first step 108 and a second step 110 are formed entirely around the first side 104 and the second side 106, respectively. The clamp 100 may have various number of sides having steps formed around them without departing from the scope of the present invention. As shown in FIG. 11, the steps 108, 110 are shaped to correspond to a shape of first and second product components 112, 114, respectively, to ensure proper engagement between the clamp and the components during clamping. In one embodiment (not shown), the clamp has a single side surrounding the clamp and the application face includes one or more steps around the side. A seal 116 of the clamp 100 contacts a third, planar, product component 118 and a vacuum is created between the clamp and the third component thereby clamping the first and second components 112, 114 to the third component. In another embodiment, the clamp 100 is used to clamp a first frame 120 to a first panel 122 and a second frame 124 to a second panel 126, as shown in FIG. 12. The clamp 100 according to the third embodiment is otherwise identical to the clamp of the first embodiment, and therefore will not be described in further detail.

Clamps 10, 80, 100 according to the present invention are used in the manufacturing of a product having at least two components. Specifically, the clamp is used to securely hold a first component to a second component so the two may be worked while they are held together. In one embodiment, a method of clamping two components 40, 42 together includes contacting the first component 40 with the step 38 of the clamp 10, as shown in FIG. 4. The method further includes contacting the second component 42 with the seal 46 of the clamp 10 to form a vacuum area 68 between the clamp and the second component, as shown in FIGS. 4 and 5. The first component 40 is releasably clamped to the second component 42 by creating a vacuum in the vacuum area 68 using the vacuum generator 70. The components 40, 42 can be worked while they are clamped together. In one embodiment, working the components 40, 42 includes forming holes 130, which may include aligned holes, in both components. In another embodiment, working the components 40, 42 includes forming holes 130 in the components and fastening the components together by positioning fasteners (not shown) in the holes formed in the components. In yet another embodiment the components are worked by fastening the components together by way of adhesive bonding, spot welding, seem welding, or other non-drilling types of fastening.

FIG. 12 shows a method of manufacturing a product according to another embodiment including clamping the first frame 120 to the first panel 122 and clamping the second frame 124 to the second panel 126. The clamp 100 is used to securely hold the frames 120, 124 to the respective panels 122, 126 so each member/panel set may be worked while held together. The method of this embodiment includes contacting the first frame 120 with the step 110 of the clamp 100. The method further includes contacting the first panel 122 with the seal 116 of the clamp 100 to form a vacuum area between the clamp and the first panel, similar to the vacuum area 68 shown in FIG. 5. The first frame 120 is releasably clamped to the first panel 122 by creating a vacuum in the vacuum area using the vacuum generator. The same process can be used to clamp the second frame 124 to the second panel 126 using the other step 108. The components 120, 122, 124, 126 can be worked while they are clamped together. In one embodiment, working the components 120, 122, 124, 126 includes forming holes 140, which may include aligned holes, in the components. In another embodiment, the working step includes forming holes 140 in the components and fastening the respective component pairs 120/122, 124/126 together by positioning fasteners (not shown) in the holes.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A vacuum-mounted clamp for clamping a first component to a second component, the clamp comprising:

a substantially rigid body having an application face, a back face opposite the application face, and a side, the application face having a step adjacent said side for engaging said first component when clamping said first component to said second component; and a flexible seal connected to the rigid body adjacent the application face having a periphery for contacting the second component to create a vacuum area between the clamp and the second component when clamping said first component to said second component;

wherein the vacuum area is in fluid communication with a vacuum generator for generating a vacuum in the vacuum area when clamping said first component to said second component.

2. A vacuum-mounted clamp as set forth in claim 1 wherein said vacuum generator is powered by a compressed air source.

3. A vacuum-mounted clamp as set forth in claim 1 wherein the application face of the rigid body includes a recess having a perimeter and the seal is partially disposed in the recess.

4. A vacuum-mounted clamp as set forth in claim 3 wherein the seal has a generally uniform thickness.

5. A vacuum-mounted clamp as set forth in claim 1 further comprising a mounting plate mounted on the seal opposite the body and connected to the body to connect the seal to the body.

6. A vacuum-mounted clamp as set forth in claim 5 wherein each of the primary body, the seal, and the mounting plate includes a fastening hole therethrough, the holes being aligned, and the clamp further includes a fastener disposed in said holes for connecting the body, the seal, and the plate.

7. A vacuum-mounted clamp as set forth in claim 6 wherein the vacuum generator is connected to the rigid body on the back face.

8. A vacuum-mounted clamp as set forth in claim 1 wherein the rigid body includes two opposite sides and said step is formed entirely around at least one of the sides.

9. A vacuum-mounted clamp as set forth in claim 1 wherein the step is shaped to correspond to a shape of said first component to ensure proper engagement with the first component when clamping said first component to said second component.

10. A vacuum-mounted clamp for use during manufacture of a product having a first frame and a first panel connected together and a second frame and a second panel connected together, the clamp comprising:

a substantially rigid body having an application face, a back face opposite the application face, a first side extending between the faces, and a second side extending between the faces opposite the first side, the application face having a step adjacent each of the first and second sides for engaging said first and second frames, respectively, during operation of the clamp, and a vacuum port extending between the faces;

a flexible seal connected to the rigid body adjacent the application, the seal having a vacuum port in fluid communication with the vacuum port in the rigid body and a periphery for selectively contacting the first and second panels to respectively create a first vacuum area between the clamp and first panel and a second vacuum area between the clamp and the second panel when clamping the first frame to the first panel and the second frame to the second panel;

wherein the clamp is operatively connectable to a vacuum generator for selectively creating a vacuum in the vacuum areas.

11. A vacuum-mounted clamp as set forth in claim 10 further comprising a mounting plate mounted on the seal opposite the body and connected to the body to connect the seal to the body, said mounting plate including a vacuum port in fluid communication with the vacuum port in the rigid body.

12. An assembly comprising a frame member having an edge with an engagement feature;

a planar member; and a vacuum clamp for clamping the planar member to the frame member, the clamp including:

a body having an application face, a back face, and a side, a portion of the application face extending beyond the side to form a step, the side configured to engage the engagement feature of the frame member; and a flexible seal extending from the application face, the seal having a periphery for contacting the planar member and forming a vacuum area over the planar member;

wherein the planar member is clamped to the frame member when the step and the side of the clamp engage the edge of the frame member, when the seal periphery is in contact with the planar member, and when a vacuum is created in the vacuum area.

* * * * *